April 14, 1936.  J. A. McGREW  2,037,641
AUXILIARY LOCOMOTIVE
Filed July 21, 1933  7 Sheets-Sheet 2
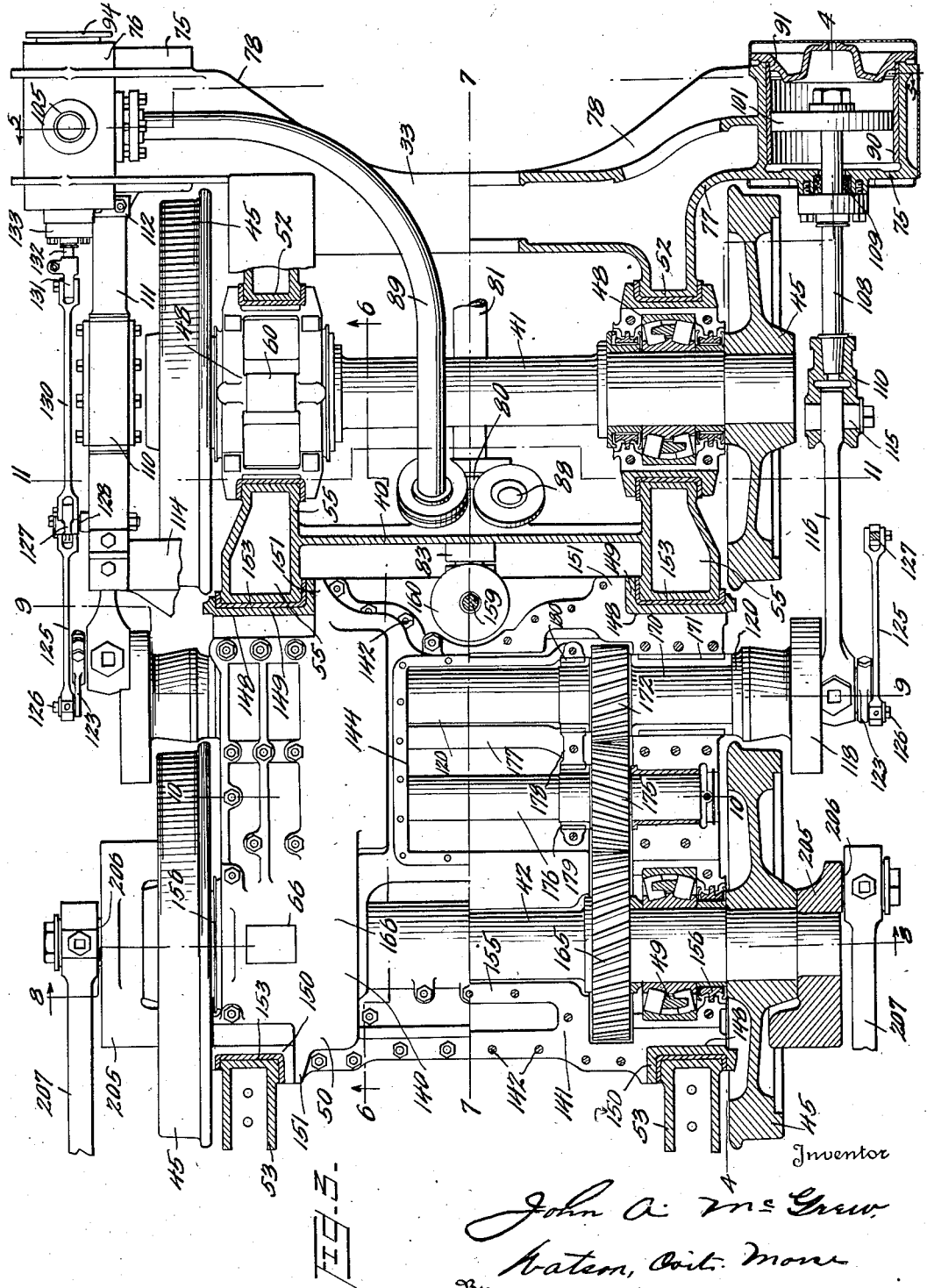
Inventor
John A. McGrew
By Watson, Cott, Moore & Grindle
Attorney

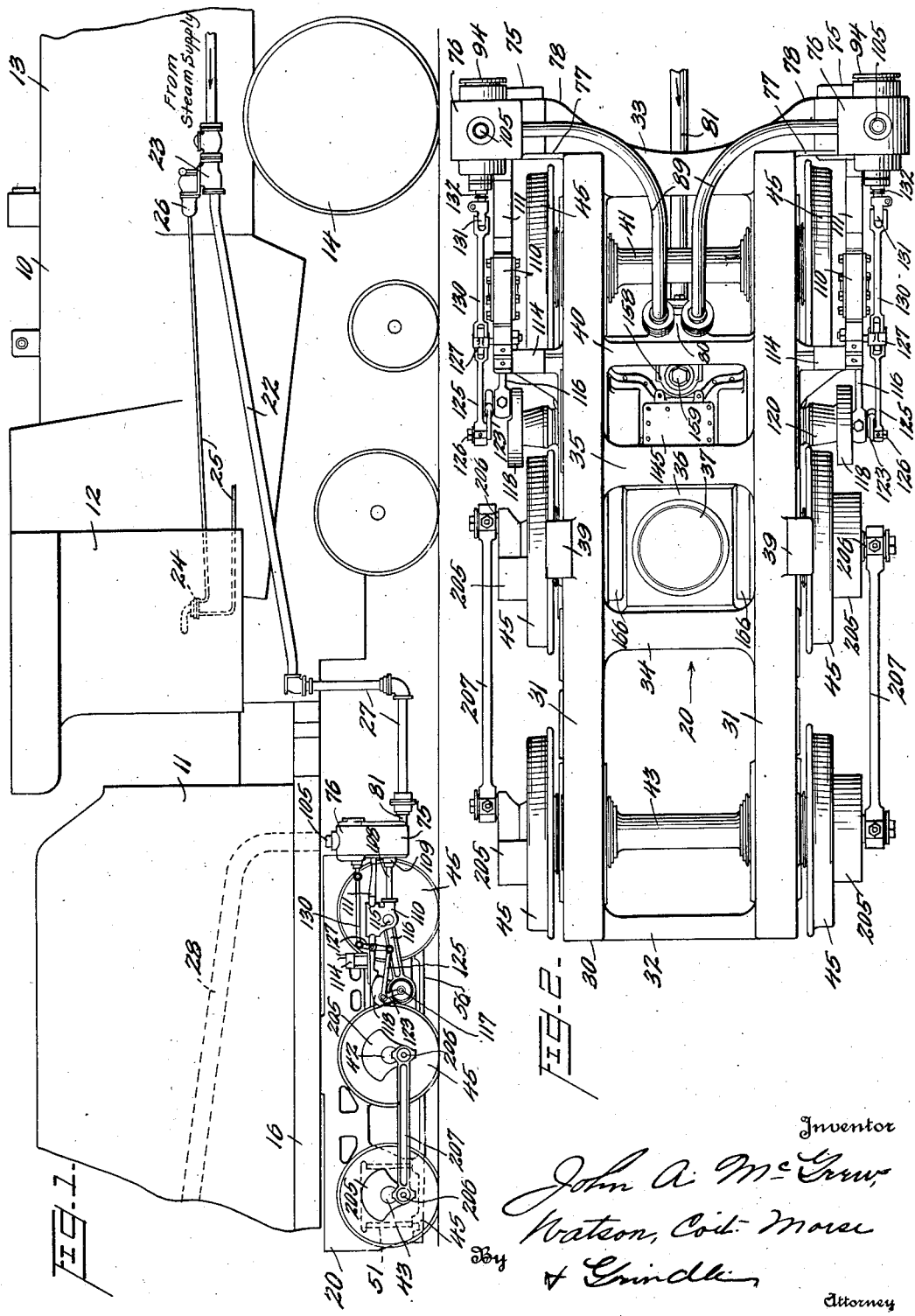

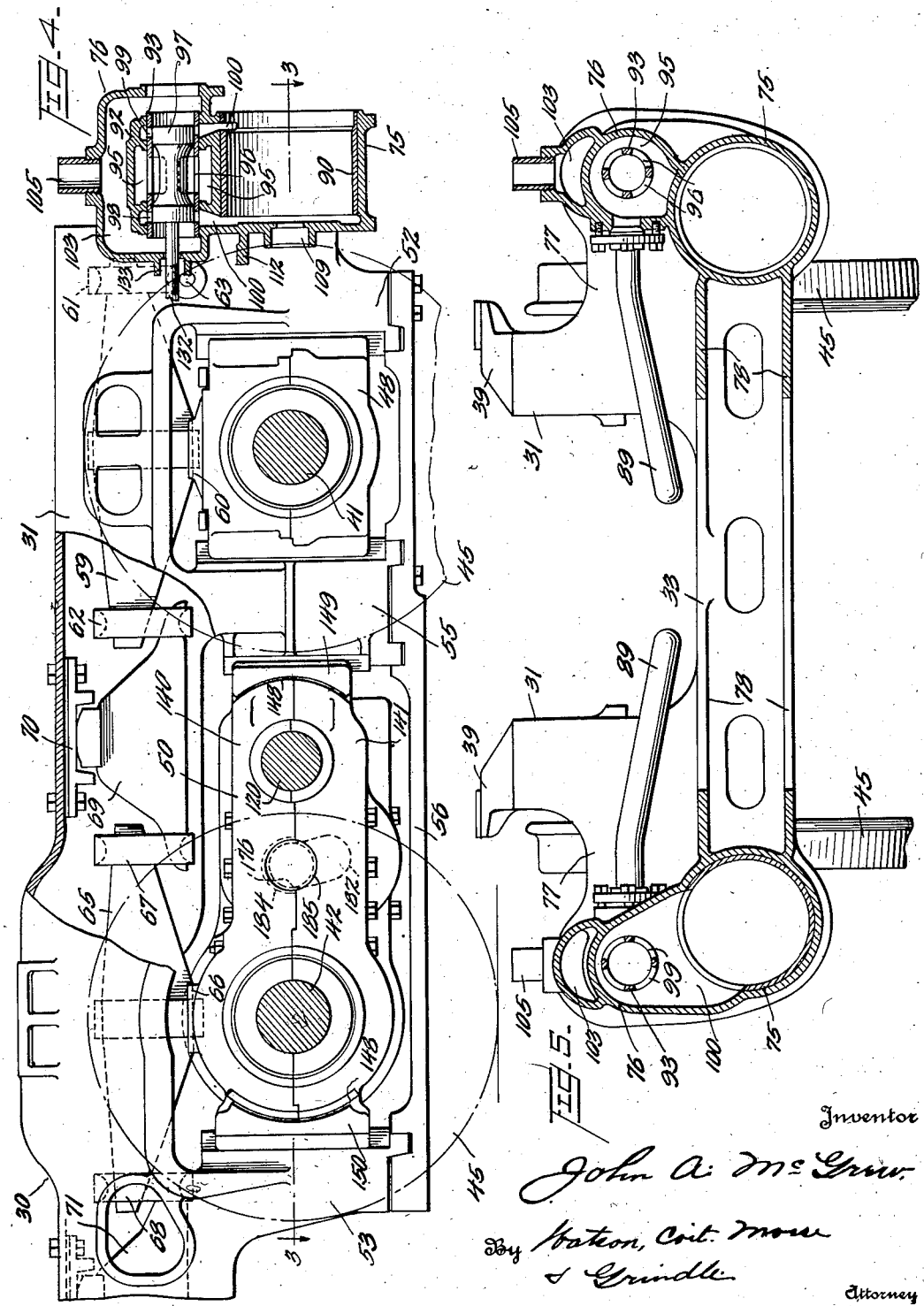

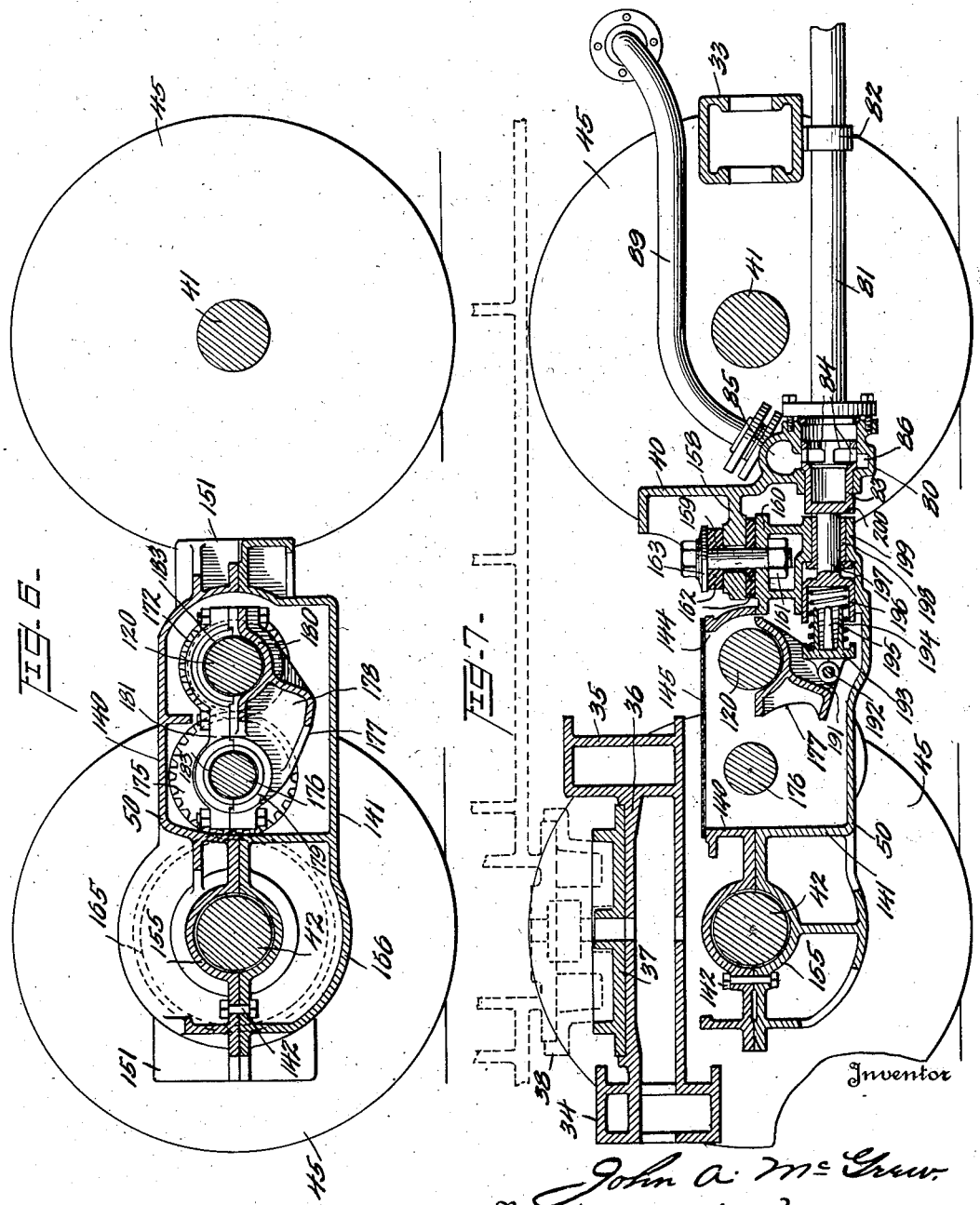

April 14, 1936. J. A. McGREW 2,037,641
AUXILIARY LOCOMOTIVE
Filed July 21, 1933 7 Sheets-Sheet 5
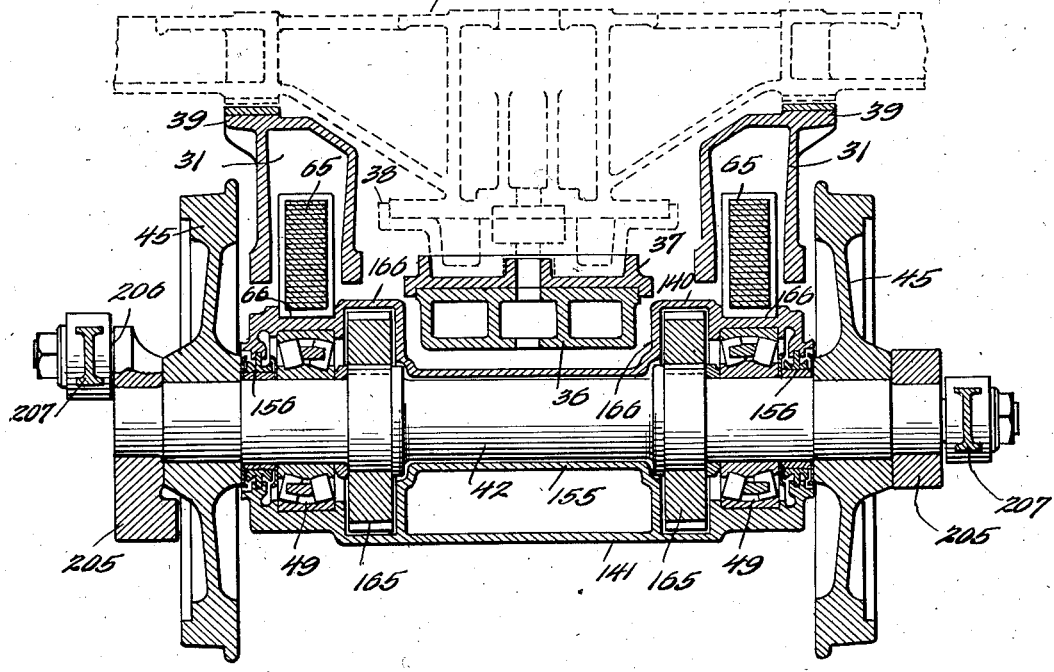
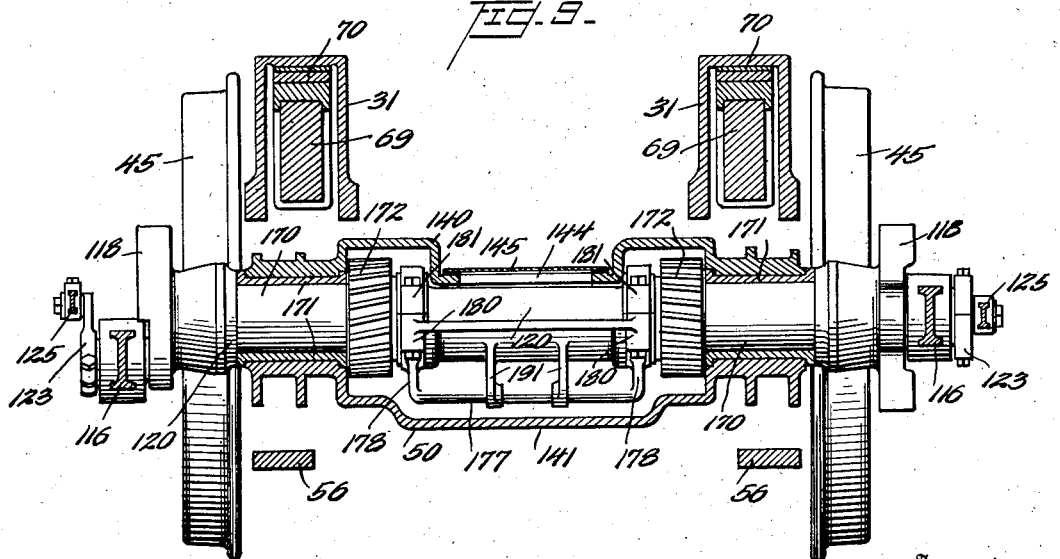
Inventor
John A. McGrew
By Bateman, Bate, Morse
+ Grindle
Attorney

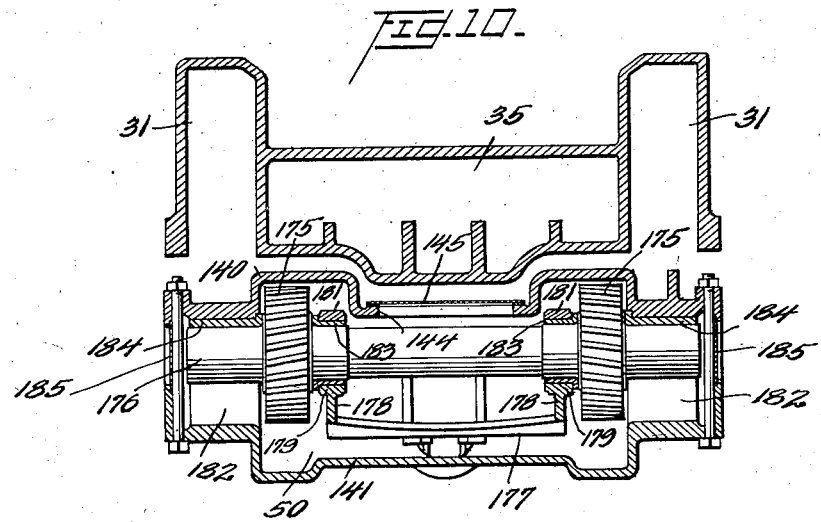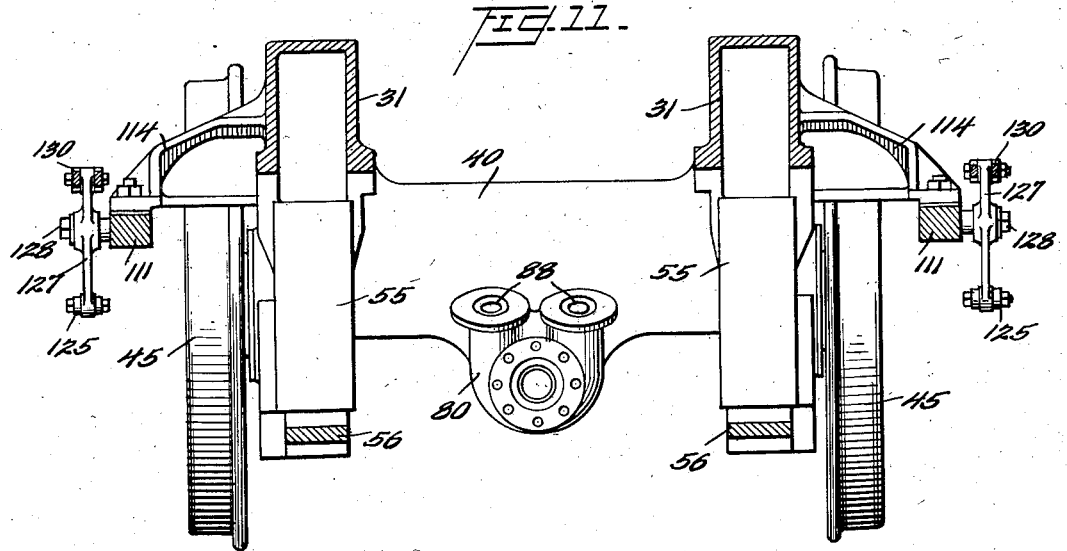

April 14, 1936.    J. A. McGREW    2,037,641
AUXILIARY LOCOMOTIVE
Filed July 21, 1933    7 Sheets-Sheet 7
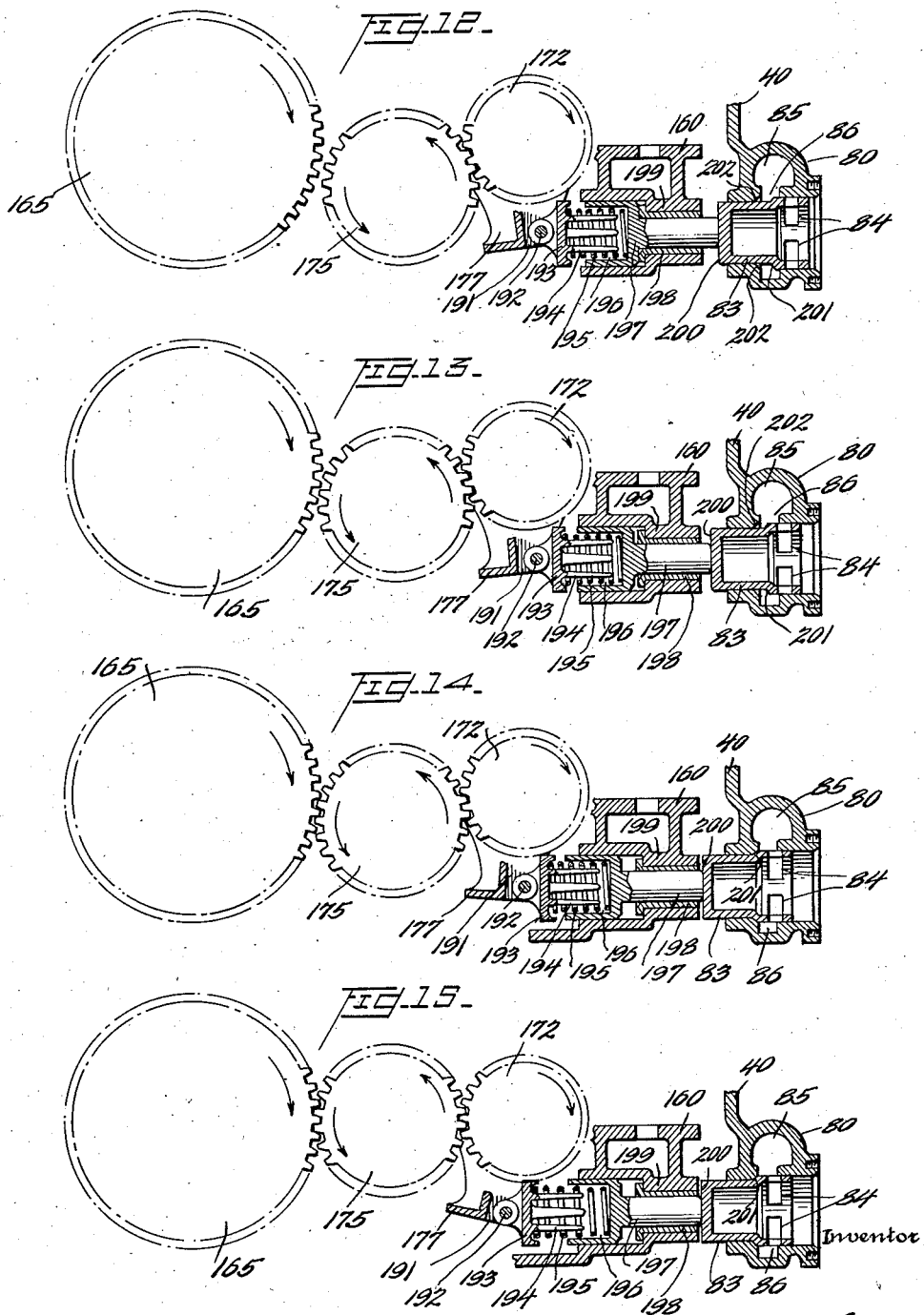

Patented Apr. 14, 1936

2,037,641

UNITED STATES PATENT OFFICE 2,037,641

AUXILIARY LOCOMOTIVE

John A. McGrew, Albany, N. Y.

Application July 21, 1933, Serial No. 681,627

33 Claims. (Cl. 105—48)

This invention relates to auxiliary locomotives, and more particularly to devices of this type which are adapted to be applied to locomotive tenders or other units of railway rolling stock in order to supplement the power of the main locomotive engines at certain times, as for example, when starting and accelerating the trains of cars, when drawing exceptionally heavy loads, or when ascending steep grades.

The general object of the invention is to provide a novel and improved auxiliary locomotive of this character.

In its preferred embodiment, the invention contemplates the provision of a power-operated truck, preferably of the six-wheeled type, which is adapted to be disposed beneath the forward end of the tender in place of the ordinary front tender truck. However, within the broad scope of the invention, the auxiliary locomotive truck may be installed beenath the rear end of the tender or beneath any desired unit of rolling stock of the train.

My improved auxiliary locomotive not only differs from the ordinary locomotive booster in operation and in general efficiency, but displays many advantages in construction over that type of auxiliary engine. For example, the engine cylinders of my auxiliary propulsion unit are rigidly carried by the truck frame,—preferably cast integrally therewith,—and are suitably connected with the source of steam supply of the main locomotive. By thus mounting the steam cylinders, the engine and transmission controlling means, and the reciprocating elements of the engine upon the truck frame, and mounting only the crank shaft and transmission gearing upon an axle, the unsprung weight of the unit is reduced to a minimum.

Another novel feature of the present invention is the application of the driving power to the central or intermediate axle of the auxiliary locomotive truck, which is, in this embodiment, of the six-wheeled type. The drive is effected from a floating crank shaft through gear trains which may be engaged and disengaged upon the proper occasion by novel actuating means associated with a control valve which simultaneously admits steam to the engines and entrains the transmission gearing. This control or regulating valve is adapted to be operated by the pressure of the steam admitted to the auxiliary locomotive by a suitable throttle valve actuated from the cab of the main locomotive. The cylinder and distributing valve arrangement in the auxiliary engine is also a feature of novelty.

My invention further contemplates a novel arrangement of these transmission gear trains with relation to the driven axle and the center bearing of the auxiliary locomotive truck upon which the tender or other unit of rolling stock is supported, in order to provide the proper clearance between the transmission and these supporting members. The general construction of the auxiliary locomotive also meets all third rail clearance requirements, which is not true of any of the so-called tender boosters of the present time.

Another object is the provision of a novel resilient and flexible transmission controlling mechanism, which is especially well adapted to absorb and dissipate shocks incidental to the occasional imperfect meshing of the gearing during entrainment.

Other objects and features of novelty will be apparent from the following specification when read in connection with the accompanying drawings in which one embodiment of my invention is illustrated by way of example.

In the drawings:

Figure 1 is a fragmentary, somewhat diagrammatic view in side elevation of adjacent portions of a railway locomotive and tender, illustrating the application of my novel auxiliary locomotive thereto;

Figure 2 is a plan view of the auxiliary locomotive disconnected from the unit of rolling stock beneath which it is adapted to be installed;

Figure 3 is a view of the forward portion of the auxiliary locomotive including the intermediate and front axles; the upper half of the figure being in plan with a portion of the truck frame broken away; and the lower half being a horizontal cross-section through the axes of the wheel axles and the cylinders of the engines taken on line 3—3 of Figure 4;

Figure 4 is a vertical longitudinal sectional view taken substantially on the line 4—4 of Figure 3, the piston of the engine being removed;

Figure 5 is a transverse sectional view taken on line 5—5 of Figure 3, the pistons and distributing valves being removed;

Figure 6 is a longitudinal vertical cross-sectional view taken on line 6—6 of Figure 3, which passes in front of the left hand idler shaft carrier bearing;

Figure 7 is a central longitudinal cross-section taken on line 7—7 of Figure 3;

Figure 8 is a vertical transverse cross-section taken substantially on the line 8—8 of Figure 3, through the middle axle;

Figure 9 is a vertical transverse sectional view taken substantially on line 9—9 of Figure 3, or through the axis of the crank shaft;

Figure 10 is a vertical transverse sectional view taken on line 10—10 of Figure 3, or through the axis of the idler gear;

Figure 11 is a transverse vertical cross-sectional view taken substantially on line 11—11 of Figure 3, the forward journal boxes and wheels being removed; and Figures 12-15, inclusive, are somewhat diagrammatic, vertical, central, longitudinal, cross-sectional views illustrating successive positions of the regulating valve of the gearing of the auxiliary locomotive during entrainment.

In the general view illustrated in Figure 1 of the drawings, the numeral 10 designates a railway locomotive, in conjunction with which my novel auxiliary locomotive is adapted to operate, and which may be of any desired type or class. The usual tender 11 is coupled to the locomotive 10 in a conventional manner. The locomotive 10 is provided with the cab 12 and the boiler 13. The driving wheels, one of which is indicated at 14, are driven from the usual steam engine cylinders at the forward end of the locomotive, the supply of steam thereto being controlled by the usual throttle valve and operating mechanism.

The tender 11 is provided with a bottom frame 16, and a rear tender truck of conventional design which is not illustrated in the drawings. In lieu of the forward tender truck, there is substituted my improved auxiliary locomotive which is designated generally by the reference character 20, and while it is adapted, as already explained, to perform the general functions of a so-called locomotive booster, it exhibits numerous advantages and improvements in construction and operation over a booster, as will be demonstrated as the description proceeds.

For the purpose of supplying motive fluid to the auxiliary locomotive the steam pipes or other suitable source on the main locomotive 10 are tapped by the conduit 22, in which is interposed a throttle valve 23. This throttle valve is adapted to be operated to control the auxiliary locomotive, by means of the air valve 24 located in the cab. By the proper actuation of the valve 24, compressed air from a suitable reservoir is allowed to pass through the pipes 25 to the throttle valve controlling motor 26, all of this mechanism being clearly illustrated and described in my copending application Serial No. 641,451 filed November 5, 1932. The steam supply conduit 22 is formed with articulated sections 27 which permit the necessary flexibility between the locomotive and the tender.

Exhaust conduits 28 which pass through the water tank of the tender are arranged to receive the exhaust steam from the cylinders of the auxiliary locomotive and to transmit the heat thereof to the water in the tank. This feature is also disclosed in my above mentioned copending application.

My improved auxiliary locomotive may be considered as comprising a modified tender truck which includes driving means for the wheels thereof and is provided with a bearing or support for the tender or other unit of rolling stock beneath which it may be disposed. The auxiliary locomotive frame is designated by the numeral 30 and comprises the side frame members 31 which are connected by the transverse end beams or transoms 32 and 33 and are joined at the central portion of the truck frame by means of the bolster transoms 34 and 35. These bolster transoms are depressed a considerable distance below the side frame members and are connected by means of the center bearing frame 36 which, as clearly shown in Figure 8 of the drawings, is provided with a bearing plate 37 upon which is supported cooperating bearing portions of the locomotive tender frame designated by the numeral 38. The side frames 31 are provided with any desired type of side bearings, such as indicated at 39 in the drawings. An additional transom 40 is disposed between the side frames in the forward portion of the auxiliary locomotive and has certain special functions which will be described later. The entire truck frame 30, including the side frames, transoms, bolsters, and center bearing frame, is preferably formed as a unitary integral casting.

The truck of the auxiliary locomotive is of the six-wheel type and is provided with the forward, intermediate and rear axles designated respectively by the numerals 41, 42, and 43. These axles are provided with the wheels 45, which, unlike those of the ordinary tender truck, are mounted upon the axles at points exteriorly of the side frames 31. The forward and rear axles 41 and 43 are provided with anti-friction journal boxes 48, while the center axle is journalled in the anti-friction bearings 49 which are enclosed within the transmission housing 50 which, as most clearly shown in Figure 4 of the drawings, is of comparatively small vertical dimensions but is adapted to extend forwardly from the intermediate axle 42 to a point approximately half way between the forward axle 41 and the intermediate axle 42. The side frame members 31 are provided with pedestals 51 of the usual form for the journal boxes of the rear axle 43. The forward pedestals 52 for the journal boxes for the forward axle 41 and the rearward pedestal 53 adjacent the intermediate axle 42 are also of conventional shape and location, but there is provided in the present construction a common pedestal member 55 for guiding the rear faces of the front journal boxes 48 and the forward end of the transmission housing 50. The pedestals 52, 53, and 55 are connected by the elongated common pedestal cap 56.

The auxiliary locomotive truck frame 30 is resiliently supported upon the journal boxes 48 and upon the transmission housing 50 by a system of springs and equalizer levers which are similar to the conventional forms and are as usual enclosed within the side frame members 31. These elements are illustrated most clearly in Figures 4, 8, and 9 of the drawings. The leaf springs 59 are seated upon the forward journal boxes 48 as at 60 and are provided at their ends with the links 61 and 62, the links 61 being pivotally connected to the truck frame 30 as at 63. The leaf springs 65 are seated upon the transmission housing 50 directly above the intermediate axle 42 as at 66. The ends of the spring assemblies 65 are provided with the pivoted spring hanger links 67 and 68. An equalizer lever 69 is fulcrumed upon the seat 70, which is secured to the side frame 31, and has its ends pivotally supported in the lower ends of the hangers or links 62 and 67. A similar equalizer lever 71 is provided between the intermediate spring 65 and a rear spring (not shown) which is disposed above the rear axle 43 and the arrangement at the rear end of the truck is exactly the same as at the forward end which has just been described.

The steam engine cylinders are designated by the numeral 75 and are preferably cast integrally with truck frame 30, as are also the steam chests and distributing valve housings 76. The forward ends of the side frame members 31 adjacent the front pedestal members 52 are flared forwardly and outwardly in order to form the webs 77 which serve to connect the cylinders with the frame at this point. The cylinders are further braced by the forwardly and outwardly curved flanges 78 of the front transom member 33.

For the purpose of controlling the transmission of the auxiliary locomotive in a manner to be more fully disclosed, there is provided upon the central portion of the transom 40 a regulating or control valve housing 80. The supply of steam for the auxiliary locomotive cylinders is adapted to pass through the control valve housing 80 and is received from the articulated portions 27 of the steam conduit 22 through the pipe 81. This pipe may be conveniently supported from the transom 33 as by means of the bracket 82, as shown in Figure 7 of the drawings. The control valve housing is provided with a hollow reciprocating valve member or piston 83, which is provided with the ports 84. The regulating valve has a steam chamber 85, therein having an annular port 86 which surrounds the valve member 83. When no steam is admitted past the throttle valve 23, the valve member 83 occupies the position shown in Figure 12 of the drawings, where it will be seen the valve port 84 is not in registry with the steam chamber port 86. As steam is admitted to the valve housing 80 by opening the throttle 23, the member 83 moves rearwardly until the ports 84 and 86 are in registry, as shown in Figures 7, 14, and 15 of the drawings, whereupon steam will flow into the chamber 85 and from thence through the pair of ports 88 into the steam pipes 89 which lead to the steam chests 76 of the engines.

The cylinders 75 are provided with the cylinder bushings 90 and the cylinder heads 91. Each valve casing 92 is provided with a bushing 93 and a head 94. Within each valve casing 92 is enclosed the annular steam chamber 95 into which the supply pipes 89 lead. The steam passes from the steam chamber 95 through the ports 96 of the valve bushing 93 into the central part thereof within which the reciprocating distributing valve 97 is adapted to reciprocate. By the properly timed movement of the valve 97 the steam is permitted to pass alternately through the ports 98 and 99 in the valve bushing and through the passages 100 into the respective ends of the cylinders 75 in order to drive the engine pistons 101, shown in Figure 3 of the drawings. The steam is alternately exhausted through the ports 98, 99, and 100 at the opposite ends of the cylinder and passes into the exhaust chamber 103. A short exhaust pipe 105 is provided in order to direct the exhaust steam upwardly into the mouths of the exhaust conduits 28 which pass through the water tank of the tender.

The piston rods 108 which carry the piston heads 101 pass through the usual stuffing boxes 109 and have their outer ends secured to the crossheads 110. The crossheads 110 are adapted to slidably receive the crosshead guides 111 which are secured at their forward ends to the brackets 112 which are formed on the cylinders 75. The rear ends of the crosshead guides 111 are bolted or otherwise secured to the brackets 114 which project outwardly from the side frame members 31 as most clearly shown in Figures 2 and 11 of the drawings. Pivotally secured to the crossheads 110 as by means of the pins 115, are the connecting rods 116 which are operatively connected at their opposite ends with the crank pins 117 carried by the counterweighted cranks 118 formed at the ends of the crank shaft 120. Outwardly of the points of connection of the connecting rods 116 with the crank shaft 120, are secured the eccentric cranks 123 which are pivotally connected with the eccentric rods 125 by means of the eccentric crank pins 126. The valve motion rockers 127 are trunnioned as at 128 upon the crosshead guide 111 and have their opposite ends pivotally connected with the eccentric rods 125 and with the valve rods 130 respectively. The forward ends of the valve rods 130 are connected as at 131 with the stems 132 of the main steam valves 97. Of course suitable packing arrangements 133 are provided for the valve rods.

The driving crank shaft 120 is enclosed within the transmission housing 50, as are also the intermediate axle 42 and the engageable driving connections between the crank shaft and this axle. The housing 50 comprises the top section 140 and the bottom or bed section 141 which are flanged and bolted together as indicated at 142 in Figure 3. The upper casing 140 is provided with an opening 144, which is adapted to be covered by a removable plate 145, and is for the purpose of gaining more convenient access to the enclosed transmission mechanism. At each of the four corners of the housing 50 there are provided arcuate bearing surfaces 148 to which are applied the correspondingly curved bearing surfaces of the forward and rear bearing shoes 149 and 150, respectively. The bearing shoes 149 and 150 are also adapted to bear inwardly upon the vertical flanges 151 formed on the housing 50. Each of the shoes 149 and 150 is provided with vertical bearing surfaces and side flanges which are adapted to contact the vertical rear faces of the common pedestal members 55 and the vertical forward faces of the pedestal 53 respectively. Between the cooperating pedestal and shoe faces there may be interposed the usual shoes or wedges 153. From this it will be clearly understood that the housing 50 is capable of tilting movement with respect to the truck frame 30 as well as limited vertical sliding movements between the faces of the pedestals 53 and 55. Furthermore, upon the occurrence of said tilting movement of the housing 50 incidental to the depression of the truck frame upon the equalizer springs 65 etc., the shoes 149 and 150 will slide vertically relatively to the pedestal and the respective ends of the housing 50 will rotate within the arcuate bearing surfaces of these shoes.

The top and bottom castings 140 and 141 of the housing 50 are adapted to surround the intermediate axle 42 and its associated parts, as shown in Figures 7 and 8 of the drawings. The intermediate portions of both of these casing sections are arranged to closely conform to the central part of the axle 42 as at 155. These cooperating casing portions are also adapted to house the roller bearings 49 and are provided exteriorly of these bearings with the packing devices or dust guards 156.

The forward end of the transmission housing 50 is resiliently supported from the transom 40 by means of the suspension bracket 158 through which passes the bolt 159 which passes through the suspension seat 160 formed on the lower or bed portion 141 of the housing 50, and has a nut 161 applied to its lower end. Upper and lower resilient cushions 162, which may be made of rubber or other suitable material, are disposed above and beneath the bracket 158 so as to be clamped by the washer 163 and the seat 160, and to provide a resilient support for the transmission housing.

Upon the intermediate axle 42 just inside of the roller bearings 49 are rigidly secured the driven gears 165 which are enclosed in the cylindrical enlarged portions 166 of the housing 50 and are spaced apart so as to provide sufficient central clearance above the axle 42 for the center bearing casting 36. It will be noted, especially from Figures 2 and 7, that the center bearing casting 36 is embraced laterally by the gear housing portions 166, and that in turn these portions lie between the bolster transoms 34 and 35. By this arrangement, sufficient clearance between the transmission housing 50 and the stationary portions of the locomotive truck frame is provided without sacrificing rigidity or sturdiness of construction nor the mechanical efficiency of the locomotive. It will be also noted in this connection that the design of the auxiliary locomotive as thus far described meets all third rail clearance requirements, which is not true of any of the so-called tender boosters in use at the present time.

The crank shaft or driven shaft 120 is provided with the trunnion portions 170 mounted in bearings 171 carried by the housing 50 and immediately interiorly of the trunnion portions 170 are mounted the driving pinions 172.

A pair of idler gears 175 is mounted on an idler gear shaft 176 and is adapted when properly engaged with the driving gears 172 and the driven gears 165 to transmit the driving force from the crank shaft 120 to the intermediate driven axle 42.

A pivoted idler gear carrier 177 is provided with the spaced arms 178, which are formed with bearing halves 179 and 180 for the reception of the trunnion portions of the idler gear shaft and the crank shaft. A double bearing cap 181 is bolted to each of the carrier arms 178 to complete the bearings. Suitable bushings 183 are also provided for these bearings. The body portion of the carrier 177 is disposed closely beneath the central portion of the crank shaft 120 as shown especially in Figure 7. Thus it will be seen that the idler gear carrier 177 may be moved about its bearings 180 on the crank shaft 120 so as to carry the idler gears 175 into and out of mesh with the driven gears 165 on the axle 42. The ends of shaft 176 move in the arcuate slots 182 in the housing 50. Bearing members 184 are disposed in the upper portions of these slots. A cover plate is shown at 185.

The engagement and disengagement of the idler gears 175 with the driven gears 165 is illustrated in Figures 12, 13, 14, and 15. In Figure 12 the gears are completely disengaged; Figure 13 illustrates the idler gear moved into face to face position with the driven or bull gears 165; Figure 14 illustrates the position in which the idler gears 175 are being drawn into complete mesh with the driven gear 165 by means of tooth pressures; and the complete meshed driving engagement of the gearing is shown in Figure 15 of the drawings. For the purpose of actuating the carrier 177 in order to move the idler gears about the axis of the crank shaft 120 into proper engagement with the axle gears, the carrier 177 intermediate its length is provided with a bracket 191 to which is pivotally connected as at 192 the spring seat member 193. This element 193 is provided with projecting fingers 194 which serve to support and center the coil spring 195. The opposite end of the coil spring 195 is received within the socket 196 formed in the rear end of the idler gear operating plunger 197. The smaller forward end of the plunger 197 is received within the bearing or bushing 198 carried by the lower forward portion 199 of the bed portion 141 of the housing 50.

When the gearing is in the disengaged position illustrated in Figure 12 of the drawings, the forward end of the plunger 197 projects beyond the front end of the housing portion 199 and is disposed in close proximity to or in contact with the rear end 200 of the regulating valve member 83. As will be readily seen from Figures 12-15, inclusive, when the valve member or piston 83 is moved rearwardly upon admission of steam to the forward portion thereof, its rear face 200 in abutting engagement with the forward end of the plunger 197 serves to move the plunger rearwardly and thus effect the pivotal movement of the carrier 177 about the axis of the driving shaft 120 until the seat 201 of the valve member 83 is in abutment with the corresponding seat 202 of the valve housing 80 as shown in Figures 14 and 15 of the drawings.

The action of my improved resilient meshing arrangement will now be described. In Figure 12 when the gearing is disentrained and there is no steam admitted to the auxiliary locomotive, the spring 195 is compressed to an extent proportionate to the load of the idler gears and the carrier arm, which may be called the normal load upon this spring. When, through admission of steam to the forward face of the valve member or piston 83, the plunger and spring are moved rearwardly to the face to face position indicated in Figure 13 of the drawings, the spring 195 has not been compressed at all. It is at this point of face to face contact that frequent damage occurs during meshing of the gearing in the ordinary arrangements. In most devices of this type in the case of initial imperfect meshing of the idler gears with the driven gears the idler gear is thrown back directly against the pressure of the steam entering the controlling valve or motor. In the present case, however, it will be readily understood that if the teeth of the idler gears 175 do not mesh immediately with the driven gears 165, the idler gears and the carrier 177 will be thrown back against the advance of the valve piston 83 and the spring 195 will be additionally compressed sufficiently to relieve the idler gear of any undue or destructive shocks. In Figure 14 the operating mechanism has initiated the intermeshing of the idler gears 175 and the driven gears 165 and it will be noted that the piston and valve member 83 has reached its extreme position. From this point on, further meshing takes place by means of tooth pressures or the drag of the gears, and the spring 195 has been relieved even of its normal carrying load under which it was compressed in the positions shown in Figures 12 and 13, and it has been expanded to the position illustrated in Figure 15.

During de-meshing or disentrainment of the gearing, the resilient idler gear operating mechanism just described also has its beneficial effects. Assuming that there still exists steam pressure against the valve or piston 83, offering resistance to the movement of the plunger 197 rearwardly, and that the downward thrust of the driven gears 165 against the gears 175 tends to throw excessive stresses in the idler gear carrying structure, it will be readily seen that these stresses will be taken up automatically by the spring 195 to prevent damage to the structure.

It will be noted by inspection of Figure 13 of the drawings that as the gears 175 and 165 are brought into face to face contact, the ports 84 and 85 of the regulating valve are just about to open to permit steam to pass to the engines of the auxiliary locomotive. From this point on, the admission of steam is gradually increased while at the same time the idler gears and the driven gears are brought into further meshing engagement. The auxiliary locomotive engines will start the driving shaft 120 moving and complete meshing engagement will occur as the idler gear rotates with respect to the driven axle gears 165. The directions of rotation of the various gears are clearly indicated by the arrows in Figures 12—15.

For the purpose of transmitting the driving force from the intermediate axle 42 to the rear axle 43, counterbalanced cranks 205 are secured to the ends of both of these axles, and the crank pins 206 thereon are connected by the side rods 207. In this way the driving force is transmitted to four wheels of the truck thus increasing the traction of the locomotive.

It will be readily understood from the preceding detailed specification, how the objects of the invention are attained, and it is also understood that the embodiment thus described is exemplary only, and numerous changes and modifications may be made therein without departing from the scope of the invention as defined in the subjoined claims.

Having thus described the invention, what is claimed as new and desired to be secured by Letters Patent is:

1. A propulsion unit for railway rolling stock comprising, in combination, a six-wheel bogie truck having a truck frame and forward, intermediate and rear wheel-carrying axles adapted to support said frame, a dropped center bearing for the supported unit of rolling stock on said truck and disposed directly above said intermediate axle, and a driving motor carried by said truck frame, power transmission mechanism driven by said motor and geared to said intermediate axle, and disposed adjacent said dropped center bearing but maintaining the necessary clearance with respect thereto during all operative positions of the unit.

2. A propulsion unit for railway rolling stock comprising, in combination, a six-wheel bogie truck having a truck frame and forward, intermediate and rear wheel-carrying axles adapted to support said frame, a driving motor carried by said truck frame, power transmission mechanism connecting said motor with said intermediate axle, and a dropped center bearing for the supported unit of rolling stock disposed on said truck directly above said intermediate axle, said transmission mechanism being operatively connected to said axle at spaced points on opposite sides of said center bearing and intermediate the wheels of said axle.

3. A propulsion unit for railway rolling stock comprising, in combination, a six-wheel bogie truck having a truck frame and forward, intermediate and rear wheel-carrying axles adapted to resiliently support said frame, a driving motor rigidly supported by said truck frame, power transmission mechanism connecting said motor with said intermediate axle, and a dropped center bearing for the supported unit of rolling stock disposed upon said truck directly above said intermediate axle, said transmission mechanism being operatively connected to said axle at spaced points on opposite sides of said center bearing and intermediate the wheels of said axle.

4. A propulsion unit for railway rolling stock comprising, in combination, a bogie truck having a truck frame and wheel-carrying axles adapted to support said frame so as to permit relative movement between said axles and said frame, a driving motor rigidly supported by said truck frame, power transmission mechanism including a crank shaft movably mounted with respect to said side frame and connecting said motor with one of said axles, a center bearing for the supported unit of rolling stock on said truck disposed directly above said intermediate axle, and gearing connecting said crank shaft with said axle at opposite sides of said center bearing.

5. A propulsion unit for railway rolling stock comprising, in combination, a bogie truck having a truck frame and wheel-carrying axles adapted to support said frame so as to permit relative movement between said axles and said frame, a steam engine having cylinders formed integrally with said truck frame, power transmission mechanism including a crank shaft movably mounted with respect to said side frame and connecting said engine with said intermediate axle, a center bearing for the supported unit of rolling stock on said truck disposed directly above said intermediate axle, gearing connecting said crank shaft with said axle at opposite sides of said center bearing, said crank shaft being resiliently supported from said frame, connecting rods connecting said engine with said crank shaft, spaced driving gears on said crank shaft, spaced gears on said intermediate axle, one on either side of said center bearing, and spaced idler gears adapted to operatively connect said crank shaft gears with said axle gears.

6. A propulsion unit for railway rolling stock comprising, in combination, a truck provided with a truck frame and wheel-carrying axles adapted to resiliently support said frame, a transverse crank shaft disposed parallel to said axles and mounted for limited translatory movement in a vertical plane with one of said axles, transmission gearing between said shaft and said axle, an engine rigidly mounted upon said truck frame, and flexible driving connections between said engine and said shaft.

7. A propulsion unit for railway rolling stock comprising, in combination, a six-wheeled truck provided with a truck frame and forward, intermediate and rear wheel-carrying axles adapted to resiliently support said frame, a transverse crank shaft disposed parallel to said axles and mounted for limited translatory movement in a vertical plane with respect to said truck and also for limited pivotal movement about said axle as a center, transmission gearing between said shaft and said axle, an engine rigidly mounted upon said truck frame, and flexible driving connections between said engine and said shaft.

8. In a propulsion unit for railway rolling stock, in combination, a bogie truck provided with a truck frame, wheel-carrying axles adapted to resiliently support said frame, and a transmission housing supported upon one of said axles for pivotal movement about said axle as a center and also supported from and guided by said frame for slight translatory movement in a vertical plane with respect thereto.

9. In a propulsion unit for railway rolling stock, in combination, a bogie truck provided with a truck frame, wheel-carrying axles adapted to resiliently support said frame, a transmission housing supported at one end upon one of said axles and guided by a portion of said frame for pivotal movement about said axle as a center and for translatory movement in a vertical plane with respect to said frame, and means for resiliently supporting the end of said housing remote from said axle from said frame.

10. In a propulsion unit for railway rolling stock, in combination, a bogie truck comprising a truck frame provided with side frame members, end and intermediate transoms and wheel-carrying axles movable with respect to said truck frame, a combined axle, journal box and transmission housing surrounding and supported by one of said axles, pedestals in said side frame members adapted to receive said housing for limited angular movement about said axle as a center, resilient means on said housing adjacent one end thereof for supporting the truck frame, and resilient means on said truck frame for supporting the other end of said housing, whereby said housing is capable also of limited translatory movement with respect to said frame.

11. In a propulsion unit for railway rolling stock, in combination, a six-wheel bogie truck comprising a truck frame provided with side frame members and forward, intermediate, and rear wheel-carrying axles movable with respect to said truck frame, a combined axle, journal box, and transmission housing surrounding said intermediate axle, pairs of pedestals for the journal boxes of the rear axle, pedestals for the front portions of the journal boxes for the forward axle, pedestals for the rear portion of said transmission housing, and common pedestals for the front portions of said housing and for the rear portions of said forward journal boxes.

12. In an auxiliary propulsion unit for railway rolling stock, in combination, a truck having a truck frame and wheel-carrying axles adapted to support said frame, pedestals on said frame, a combined axle, journal box and transmission housing received between said pedestals for limited vertical movement, and means for guiding said housing in limited tilting movement within said pedestals.

13. In an auxiliary propulsion unit for railway rolling stock, in combination, a truck having a truck frame and wheel-carrying axles adapted to support said frame, pedestals on said frame, a combined axle, journal box and transmission housing received between said pedestals for limited vertical movement, and guide shoes slidable in said pedestals and having curved bearing surfaces for receiving similar surfaces on said housing for guiding said housing in limited tilting movement within said pedestals.

14. In a propulsion unit for railway rolling stock, in combination, a six-wheel truck comprising a truck frame including side frame members connected by end beams and a centrally disposed bolster frame, said bolster frame comprising a pair of transoms connected at their midportions by a center bearing, which overlies the intermediate axle of the truck, a transmission assembly operatively associated with said intermediate axle, extending beneath said transoms and said center bearing, and including a pair of spaced gears on said intermediate axle each adapted to extend upwardly between said transoms upon either side of said center bearing.

15. In a propulsion unit for railway rolling stock, in combination, a six-wheel truck comprising a truck frame including side frame members connected by end beams and a centrally disposed bolster frame, said bolster frame comprising a pair of transoms connected at their midportions by a center bearing, which overlies the intermediate axle of the truck, a transmission assembly operatively associated with said intermediate axle, extending beneath said transoms and said center bearing, and including a pair of spaced gears on said intermediate axle each adapted to extend upwardly between said transoms upon either side of said center bearing, a housing for said transmission gearing pivotally carried by said intermediate axle, and means for resiliently supporting another portion thereof from another transom of the truck.

16. A truck frame casting for use in a propulsion unit for railway rolling stock, comprising a pair of side frames connected at intervals by transoms and including journal box pedestals and an integral steam engine cylinder and steam chest formed outwardly of one end of each side frame, an end transom connecting the ends of said side frames and said engine cylinders on the opposite sides of said truck, and integral webs connecting said cylinder and steam chest portions with adjacent pedestals.

17. In an auxiliary locomotive comprising a power driven truck for railway rolling stock, in combination, a truck frame, wheel-carrying axles resiliently supporting said frame, steam engine cylinders and steam chests containing the usual slide valves rigidly carried by said frame, an engine controlling valve mechanism also rigidly supported by said truck frame, said mechanism including a movable valve body, transmission mechanism carried by one of said axles, and flexible driving connections between said transmission mechanism and said engine cylinders, and flexible transmission controlling connections between said transmission and said valve body.

18. In an auxiliary locomotive comprising a power driven truck for railway rolling stock, in combination, a truck frame comprising side frame members rigidly connected by transoms, wheel-carrying axles resiliently supporting said frame, steam engine cylinders formed integrally with the ends of said side members, transmission mechanism carried by one of said axles, a transmission controlling valve housing formed integrally with one of said transoms, means for admitting steam to said controlling valve, and steam connections between said housing and said cylinders.

19. In an auxiliary locomotive comprising a power driven truck for railway rolling stock, in combination, a truck frame comprising side frame members rigidly connected by transoms, wheel-carrying axles resiliently supporting said frame, steam engine cylinders formed integrally with the ends of said side members, transmission mechanism carried by one of said axles, a transmission controlling valve housing formed integrally with one of said transoms, means for admitting steam to said controlling valve, steam connections between said housing and said cylinders, said transmission mechanism being resiliently supported from said transom, a piston associated with said controlling valve, and a transmission controlling plunger carried by said transmission mechanism and arranged in abutting relation with said controlling valve piston whereby a flexible connection is provided between said controlling valve and said transmission.

20. In an auxiliary locomotive of the class described, a transmission housing which is capable of both tilting and vertical sliding movement with respect to the frame of said locomotive and which is provided for this purpose with arcuate bearing surfaces at its ends, and bearing shoes at the ends of said housing having cooperative arcuate bearing surfaces for contact with said housing surfaces and straight bearing surfaces for contact with corresponding surfaces on said frame.

21. Power transmission mechanism for auxiliary locomotives or the like, including a driving gear, a driven gear, and an idler gear operatively connected with said driving gear and adapted to be brought into intermeshing engagement with said driven gear, means for moving said idler gear to effect said engagement comprising a resiliently extensible and compressible plunger operatively connected with said idler gear.

22. Power transmission mechanism for auxiliary locomotives or the like, including a driving gear, a driven gear, and an idler gear operatively connected with said driving gear and adapted to be brought into intermeshing engagement with said driven gear, means for moving said idler gear to effect said engagement comprising a reciprocating member, and a compression spring operatively connecting said reciprocating member and said idler gear.

23. Power transmission mechanism for auxiliary locomotives or the like, including a driving gear, a driven gear, and an idler gear operatively connected with said driving gear and adapted to be brought into intermeshing engagement with said driven gear, means for moving said idler gear to effect said engagement comprising a carrier for said idler gear, a steam operated piston, a compression spring disposed between said piston and said carrier to absorb any shocks incident to the entrainment of the gearing, said spring adapted to be normally compressed by the weight of the idler gear and carrier, additionally compressible in case of improper meshing of the gears, and extensible when the idler gear is moved into final meshing engagement by tooth pressure.

24. In an auxiliary locomotive comprising a power driven truck for railway rolling stock, in combination, a truck frame comprising side frame members, wheel carrying axles resiliently supporting said frame, steam engine cylinders carried by said side frame members, transmission mechanism carried by one of said axles, a control valve housing rigidly carried by said truck frame, means for admitting steam to said valve housing, steam connections between said housing and said cylinders, said transmission mechanism adapted to move relatively to the truck frame with the axle by which it is carried, a piston associated with said controlling valve, and a transmission controlling plunger carried by said transmission mechanism and arranged in abutting relation with said controlling valve piston, whereby a flexible operative connection is provided between said controlling valve and said transmission mechanism.

25. In an auxiliary locomotive comprising a power driven truck for railway rolling stock, in combination, a truck frame, wheel carrying axles resiliently supporting said frame, a steam engine carried by said frame, transmission mechanism associated with one of said axles, a housing for said transmission mechanism movably carried by said axle and a portion of said truck, a valve and motor housing rigidly carried by said truck, a reciprocating valve and motor member in said housing for controlling the flow of steam to said engine and the operation of said transmission mechanism, a movable member carried by said transmission housing and adapted to actuate said transmission mechanism, said movable member projecting from said housing and arranged in abutting relation with said valve and motor member whereby a flexible connection is provided between the relatively stationary controlling valve and motor and said movable transmission mechanism.

26. Power transmission mechanism for auxiliary locomotives or the like, including a driving gear, a driven gear, and an idler gear operatively connected with said driving gear and adapted to be brought into intermeshing engagement with said driven gear, means for moving said idler gear to effect said engagement comprising a movable plunger, a compression spring disposed between said plunger and said idler gear to absorb any shocks incident to the entrainment of the gearing, said spring adapted to be normally compressed by the weight of said idler gear, additionally compressible in case of improper meshing of the gears, and extensible when the idler gear is moved into final meshing engagement by tooth pressure.

27. In an auxiliary locomotive comprising a power driven truck for railway rolling stock, in combination, a truck frame comprising side frame members, wheel carrying axles resiliently supporting said frame, steam engine cylinders carried by said side frame members, transmission mechanism carried by one of said axles, a control valve housing rigidly carried by said truck frame, means for admitting steam to said valve housing, steam connections between said housing and said cylinders, said transmission mechanism adapted to move relatively to the truck frame with the axle by which it is carried, said power transmission mechanism including a driving gear, a driven gear and an idler gear operatively connected with said driving gear and adapted to be brought into intermeshing engagement with said driven gear, means for moving said idler gear to effect said engagement comprising a reciprocating member, and a compression spring operatively connected between said reciprocating member and said idler gear, and a piston associated with said controlling valve and arranged in abutting relation with said reciprocating member, whereby a flexible and resilient operative connection is provided between said controlling valve and said transmission mechanism.

28. Power transmission mechanism for auxiliary locomotives or the like, including a drive shaft, a driving gear mounted thereon, a driven gear, and an idler gear operatively connected with said driving gear and adapted to be brought into intermeshing engagement with said driven gear, an axle upon which said idler gear is carried, means for moving said idler gear to effect said engagement comprising a carrier for said idler gear, said carrier comprising a yoke adapted to embrace said drive shaft and said idler gear axle, a depending portion on said carrier yoke, power operated means for moving said idler gear, and a compression spring operatively connected between said depending portion and said power operated means.

29. In combination with a six-wheel bogie truck of generally conventional arrangement, having forward and rear wheel carrying axles disposed symmetrically with respect to the intermediate axle, the truck being resiliently supported upon said axles for limited relative movement with respect thereto, said truck also including a conventional dropped center bearing closely adjacent said intermediate axle, a driving motor rigidly supported by said truck frame, and power transmission mechanism driven by said motor and including gearing operatively connected with said intermediate axle, said transmission mechanism being supported from said intermediate axle and from said truck frame, and said center bearing and transmission mechanism being so arranged as to provide adequate clearances therebetween.

30. In a propulsion unit for railway rolling stock, in combination, a six-wheel bogie truck comprising a truck frame provided with side frame members, end and intermediate transoms, and forward, intermediate, and rear wheel-carrying axles movable with respect to the truck frame, a combined axle, journal box, and transmission housing, bearings for said intermediate axle adjacent one end of said housing, a transversely disposed crank shaft having bearings in said housing adjacent the opposite end thereof, pedestals in said side frame members adapted to receive said housing for limited vertical movement, resilient means on said housing for supporting said truck frame, and resilient means adjacent said crank shaft bearings for suspending said last named end of said housing from one of said transoms.

31. In an auxiliary propulsion unit for railway rolling stock, in combination, a truck having a truck frame and wheel carrying axles supporting said frame, pedestals on said frame having mutually facing vertical bearing faces, a combined axle, journal box, and transmission housing received between said faces and capable of rocking movement about said axle, bearing means interposed between and contacting with said housing and said vertical pedestal faces for guiding the housing during its rocking movement between the straight vertical faces of the pedestals.

32. In an auxiliary propulsion unit for railway rolling stock, in combination, a truck having a truck frame and wheel carrying axles supporting said frame, pedestals on said frame having mutually facing vertical bearing faces, a combined axle, journal box, and transmission housing received between said faces and capable of rocking movement, curved bearing surfaces on the housing, shoes interposed between said housing and said pedestal faces and having curved inwardly directed bearing surfaces for contact with the correspondingly curved surfaces of the housing and straight bearing surfaces for contact with the vertical surfaces of the pedestals.

33. In an auxiliary propulsion unit for railway rolling stock, in combination, a truck having a truck frame and wheel carrying axles supporting said frame, pedestals on said frame having mutually facing vertical bearing faces, a combined axle, journal box, and transmission housing received between said faces, said housing being supported upon said axle at one end and resiliently supported from a portion of said truck frame at the other end, conventional spring suspension means interposed between said axle supported end and the truck frame, curved bearing surfaces on the housing, shoes interposed between said housing and said pedestal faces and having curved inwardly directed bearing surfaces for contact with the correspondingly curved surfaces of the housing and straight bearing surfaces for contact with the vertical surfaces of the pedestals.

JOHN A. McGREW.